(12) United States Patent
Wooten

(10) Patent No.: US 7,921,286 B2
(45) Date of Patent: Apr. 5, 2011

(54) COMPUTER INITIALIZATION FOR SECURE KERNEL

(75) Inventor: David Rudolph Wooten, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 811 days.

(21) Appl. No.: 11/939,568

(22) Filed: Nov. 14, 2007

(65) Prior Publication Data

US 2009/0125716 A1   May 14, 2009

(51) Int. Cl.
*H04L 29/06* (2006.01)
(52) U.S. Cl. .................. 713/164; 713/165; 713/167
(58) Field of Classification Search .................. 713/164, 713/165, 167
See application file for complete search history.

(56) References Cited

U.S. PATENT DOCUMENTS

| | | | |
|---|---|---|---|
| 5,974,573 A * | 10/1999 | Martin | 714/48 |
| 6,782,349 B2 | 8/2004 | Challener et al. | |
| 7,210,034 B2 | 4/2007 | Smith | |
| 7,747,848 B1 * | 6/2010 | Nallagatla et al. | 713/2 |
| 2003/0182561 A1 | 9/2003 | Challener et al. | |
| 2004/0003288 A1 | 1/2004 | Wiseman et al. | |
| 2005/0021968 A1 | 1/2005 | Zimmer et al. | |
| 2005/0033972 A1 | 2/2005 | Watson | |
| 2005/0108564 A1 | 5/2005 | Freeman et al. | |
| 2005/0114639 A1 * | 5/2005 | Zimmer | 712/244 |
| 2005/0262571 A1 | 11/2005 | Zimmer et al. | |
| 2006/0010326 A1 | 1/2006 | Bade et al. | |
| 2006/0242406 A1 | 10/2006 | Barde et al. | |
| 2007/0198604 A1 * | 8/2007 | Okada et al. | 707/202 |

OTHER PUBLICATIONS

CPU MISER: A Performance-Directed, Run-Time System for Power-Aware Clusters; Rong Ge; Xizhou Feng; Wu-chun Feng; Cameron, K.W.; Parallel Processing, 2007. ICPP 2007. International Conference on Publication Year: 2007, pp. 18.*
IBM Redbooks I Introduction to the System z Hardware Management Console, printed year 2010.*
Microsoft Management Console; From Wikipedia, the free encyclopedia; printed year 2010.*
Dell Systems Management Consoles; Dell; printed year 2010.*
Sailer, et al., "Design and Implementation of a TCG-based Integrity Measurement Architecture", Proceedings of the 13th USENIX Security Syposium, Aug. 9-13, USENIX Association, 2004, pp. 17.
Pearson, et al., "Analysis of Trust Properties and Related Impact of Trusted Platforms", 2005, Hewlett-Packard Development Company, pp. 18.
Garriss, et al., "Towards Trustworthy Kiosk Computing", Proceedings of 8th IEEE Workshop on Mobile Computing Systems and Applications (HotMobile), Feb. 2007, pp. 1-7.

* cited by examiner

Primary Examiner — David Y Jung

(57) ABSTRACT

Dynamic Root of Trust for Measurement (DRTM) mechanisms can be initiated, not by CPU-manufacturer-specific instructions, but by the execution of code in System Management Mode (SMM) that can modify the values stored in specific Platform Configuration Registers (PCRs) of a Trusted Platform Module (TPM). The SMM code can be verified prior to execution and it can be trusted based on the secure mechanisms used to update such code. The SMM code can restore a known, trusted state of the computing device and can initiate the measuring of subsequently executed code. In such a manner the Trusted Computing Base (TCB) can be limited.

20 Claims, 7 Drawing Sheets

COMPUTER INITIALIZATION FOR SECURE KERNEL

BACKGROUND

The process of booting a computing device prepares the computing device to perform useful tasks under control of an operating system. The initial application of power to the electronic circuitry of a computing device generally only renders the computing device capable of performing rudimentary tasks, such as fetching instructions embedded into hardware components of the computing device. Thus, the boot process executes those instructions, and initiates processes that enable a computing device to perform more complex tasks. However, because the boot process performs operations prior to the execution of the operating system and any other software whose execution utilizes the operating system, malicious code executed during the boot process can remain undetected but can affect the ongoing execution properties of the system.

To provide protection against malicious code, the notion of a "trusted computer" was developed whereby the state of the computing device could be ascertained. To that end, a "Trusted Platform Module" (TPM) chip was added to the computing device, which could maintain values in a secure manner and, therefore, be used to ascertain if the computer had booted properly. In particular, the TPM chip comprises registers known as "Platform Configuration Registers" (PCRs) that store values that uniquely identify measurements of the system that have been taken since power was applied to the circuitry of the computing device. These measurements are indicative of the software that is executed during the boot process and of the presence and configuration of various hardware components. If the proper measurements were made in the correct order, then the PCRs of the TPM would contain unique values that could be used to verify that the computing device did indeed boot in a recognizable way. If the measurements are recognized to represent a computer that has booted in a trusted way, then the machine is in a trusted state when it begins executing the operating system software. In such a manner, malicious code in the boot sequence can be detected.

The measurements that are made during the boot process are combined to define the trust state of the machine. The measurements are, therefore, considered to represent the so called "Trusted Computing Base" (TCB). Unfortunately, not all measurements taken during the booting of a computing device comprise an equivalent security risk. Thus, using the TPM to verify all of the instructions executed during the booting of a computing device can complicate the evaluation of the TCB beyond what it reasonably needs to be. As a result, deviations that would otherwise be insignificant can result in an inability to determine if the computer is in a trusted state. Consequently, some CPU manufacturers have added specific CPU instructions to their instructions sets that can be used to implement a more dynamic concept of a TCB. The relevant CPU instruction causes the CPU to perform a number of tasks. For example, the CPU can be instructed to protect an identified sequence of instructions, usually by placing the instructions into the CPU's cache memory and then locking it to prevent modifications by outside agents such as a Direct Memory Access (DMA) instruction. In addition, the relevant CPU instruction can reset the "Dynamic Root of Trust of Measurement" (DRTM) PCRs, in particular PCRs 17 through 20, in the TPM to a value of zero, and can then transmit the contents of the protected sequence of instructions to the TPM, which can create a secure hash of this code and store it into PCR 17. Lastly, the relevant CPU instruction can cause the CPU to begin execution of the measured, protected code. Consequently, at the end of this sequence of operations, PCR 17 will contain a value that uniquely identifies the protected code executed by the CPU from its cache memory. Additional code that can be executed after the relevant CPU instruction can also be measured and that measurement can then be combined into one or more of the PCRs 17 through 20. The TCB, as represented by the measurements combined into PCRs 17 through 20, can thus comprise only the code executed since the invocation of the relevant CPU instruction rather than all of the code which executed since the time that the machine was booted. This reduces the size of the TCB and simplifies the trust evaluation of the system.

SUMMARY

Computing devices can traditionally implement a special mode, known as "System Management Mode" (SMM) that enables the manufacturer of the computing device to perform repair-type operations or provide value-added functions to the computing device at a highly privileged level. Traditionally, code to be executed in SMM is initialized when the computing device is booted and is loaded into memory and locked to prevent modification by subsequent code, such as the operating system. The SMM code is also checked and is included as part of the Trusted Computing Base (TCB). SMM execution can be directly initiated by hardware actions, and SMM execution can, traditionally, not be prevented by the operating system. Furthermore, the operating system, traditionally, has no direct control over the SMM code that is executed, and such SMM code can be capable of modifying the state of any hardware element on the computing device. As a consequence, SMM code is regarded to have superior privileges to the operating system and can, thereby, impact the security of the computing device, despite the proper loading of everything else in the TCB. The ultimate security of the computing device is, therefore, dependent not only on the other elements in the TCB running on the CPU under the control of the operating system, but also on the SMM code as well.

Therefore, in one embodiment, rather than relying on CPU-manufacturer-implemented specific CPU instructions to implement a dynamic measurement of a TCB, SMM code can be used to perform similar tasks. Such SMM code can provide protections to a selected set of code, reset appropriate Platform Configuration Registers (PCRs) in the Trusted Platform Module (TPM), and adjust their value in accordance with subsequently executed code. The ultimate values of the relevant PCRs can, thereby, determine if the computing device was booted in a trusted manner, and further operation of the computing device can be contingent on their values.

In another embodiment, the relevant SMM code can be confirmed to be trustworthy prior to execution. In particular, the SMM code can be measured and the resulting measurement can be compared to a value representing known good SMM code. Such a known good value can be stored, in a signed form, with the SMM code itself. The measuring of the SMM code can occur as part of a static determination of a TCB representing the configuration and behavior of the computing device since it was reset or powered on.

In a further embodiment, relevant portions of a computing device, such as the CPU and other chipsets, can be designed to limit the ability to reset appropriate PCRs in the TPM to CPU-manufacturer-implemented specific CPU instructions and to SMM code executed while the computing device is in system management mode.

A still further embodiment contemplates a normalization of the placing of a computing device into a verifiable trusted state by providing for a common request for dynamic measurement of the TCB which the manufacturer of the computing device can implement through either conventional means, or via the SMM code of the above embodiments. This standardization of the interface to the dynamic measurement process can enable each manufacturer to choose the implementation means that is best suited to their CPU and supporting chipset while providing a common interface for software interoperability.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
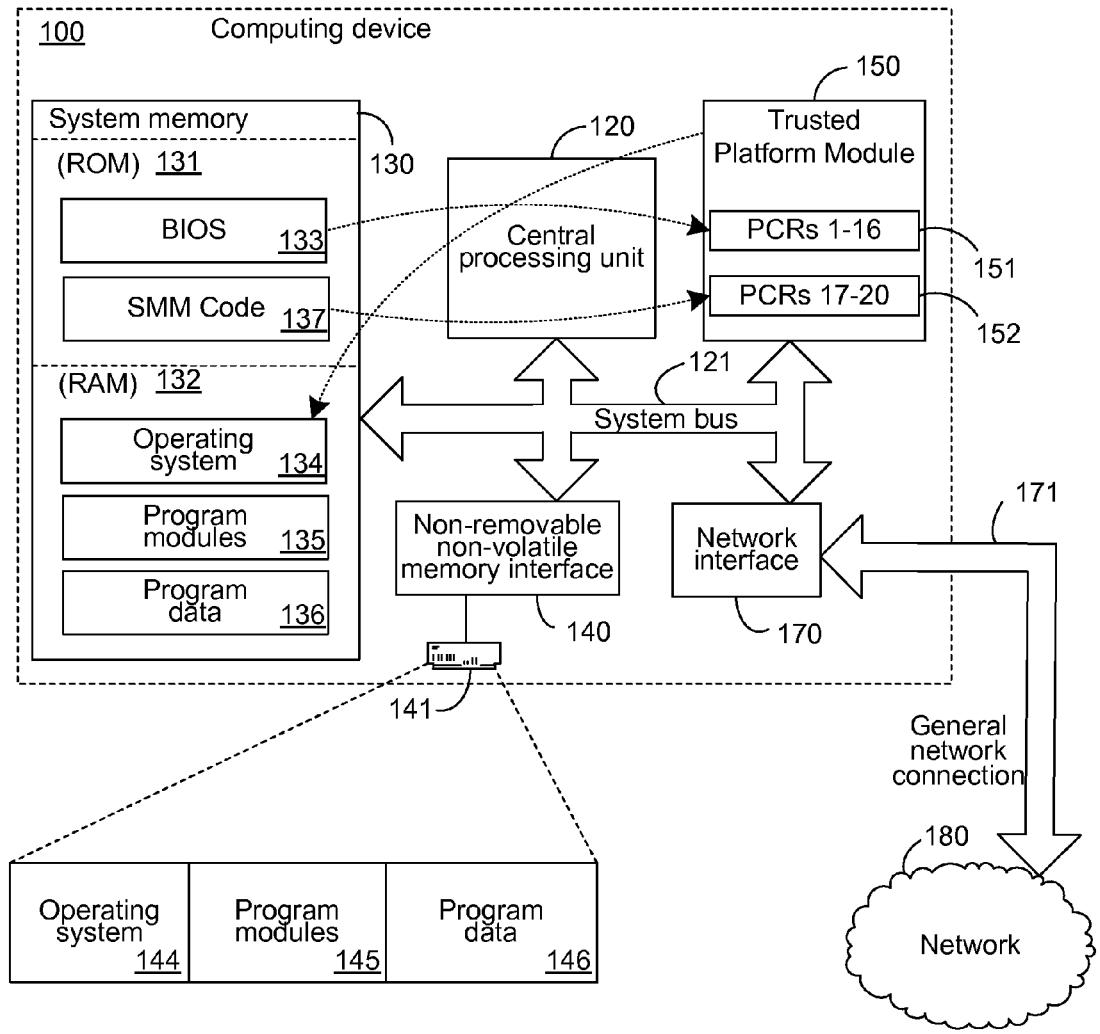
FIG. 1 is a diagram of an exemplary computing device comprising elements for implementing a secure booting process.

The following description relates to securely booting a computing device by utilizing System Management Mode (SMM). In one embodiment, the code executed while the computing device is in system management mode, referred to herein as "SMM code," can reset appropriate registers within a Trusted Platform Module (TPM) chip and then store within such registers values uniquely derived from code to be subsequently executed by the computing device. For security purposes, in another embodiment, the relevant chipsets of the computing device can be designed to limit the right to reset those registers to the SMM code, or to a CPU-manufacturer-implemented specific CPU instruction. The values of appropriate registers within the TPM can then be based on the actions and configuration of the computing device subsequent to the execution of the SMM code. Consequently, by reference to appropriate registers in the TPM, the placing of the computing device into a trusted state can more easily be verified, and, additionally, usability of the computing device can be made contingent upon the values of such registers. In a further embodiment, the SMM code itself can be verified prior to its execution by a trusted process. In a still further embodiment, a normalized mechanism can provide for the placing of a computing device into a verifiable trusted state, thereby enabling manufacturers of the computing device to implement whichever process, supported by the normalized mechanism, is best suited to their CPU and supporting chipset.

The techniques described herein focus on the usage of SMM code in conjunction with existing mechanisms for establishing a "Trusted Computing Base" (TCB). However, the teachings below are equally applicable to other mechanisms having similar privileges as SMM code, and to other mechanisms for verifying a proper booting of the computing device. Consequently, the descriptions below are not meant to limit the enumerated embodiments to SMM code or to the other specific mechanisms referenced.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary computing device 100 is illustrated, comprising, in part, hardware elements referenced further in the methods described below. The exemplary computing device 100 can include, but is not limited to, one or more central processing units (CPUs) 120, a system memory 130, a Trusted Platform Module (TPM) 150, and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and the TPM 150 can be physically co-located, such as on a single chip. In such a case, some or all of the system bus 121 can be nothing more than silicon pathways within a single chip structure and its illustration in FIG. 1 can be nothing more than notational convenience for the purpose of illustration.

The TPM 150 can provide encryption keys and store values such that they are protected by the hardware design of the TPM 150 itself. In addition, the TPM 150 can comprise Platform Configuration Registers (PCRs), exemplarily illustrated by groups of PCRs 151 and 152. The PCRs 151 and 152 can securely store data provided to the TPM 150 by the CPU 120 via the system bus 121. Traditionally, only specific code executed by the CPU 120 would be permitted to send data to the TPM 150 that would modify the values stored in the PCRs 151 and 152.

The computing device 100 also typically includes computer readable media, which can include any available media that can be accessed by computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 100 may operate in a networked environment via logical connections to one or more remote computers. The logical connection depicted in FIG. 1 is a general network connection 171 to a network 180 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Among computer storage media, the system memory 130 comprises computer storage media in the form of volatile and/or nonvolatile memory, including Read Only Memory (ROM) 131 and Random Access Memory (RAM) 132. A Basic Input/Output System 133 (BIOS), containing, among other things, code for booting the computing device 100, is typically stored in ROM 131. In addition, the ROM 131 can comprise SMM code 137 that can be executed while the computing device 100 is in System Management Mode, including during the boot process, as described further below. RAM 132 typically contains data and/or program modules that are immediately accessible to and/or presently being operated on by processing unit 120. By way of example, and not limitation, FIG. 1 illustrates operating system 134, other program modules 135, and program data 136.

As will be described in additional detail below, the computer-executable instructions, or code, stored in the BIOS 133 can, when executed by the CPU 120, provide information to the TPM 150 that can be used to modify PCRs 1-16 151, or other equivalent registers, including registers outside of the TPM 150. In addition, in the illustrated embodiment, the SMM code 137 can, when executed by the CPU 120, provide information to the TPM 150 that can be used to modify PCRs 17-20 152. In another embodiment, the SMM code 137 can be the exclusive mechanism by which the TPM 150 provides for the modification of the values stored in the PCRs 17-20 152. Within the context of FIG. 1, dashed lines indicate the relationship between the BIOS code 133, as executed by the CPU 120, and the PCRs 1-16 151 that can be modified by such BIOS code 133, and the relationship between the SMM code 137, as executed by the CPU 120, and the PCRs 17-20 152 that can be modified by such SMM code 137. The dashed lines of FIG. 1 further indicate that information from the PCRs 1-16 151 and 17-20 152 can be provided by the TPM 150 to, traditionally, the operating system 134, though such information could likewise be provided to any of the program modules 135.

The computing device 100 may also include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Figure 2:
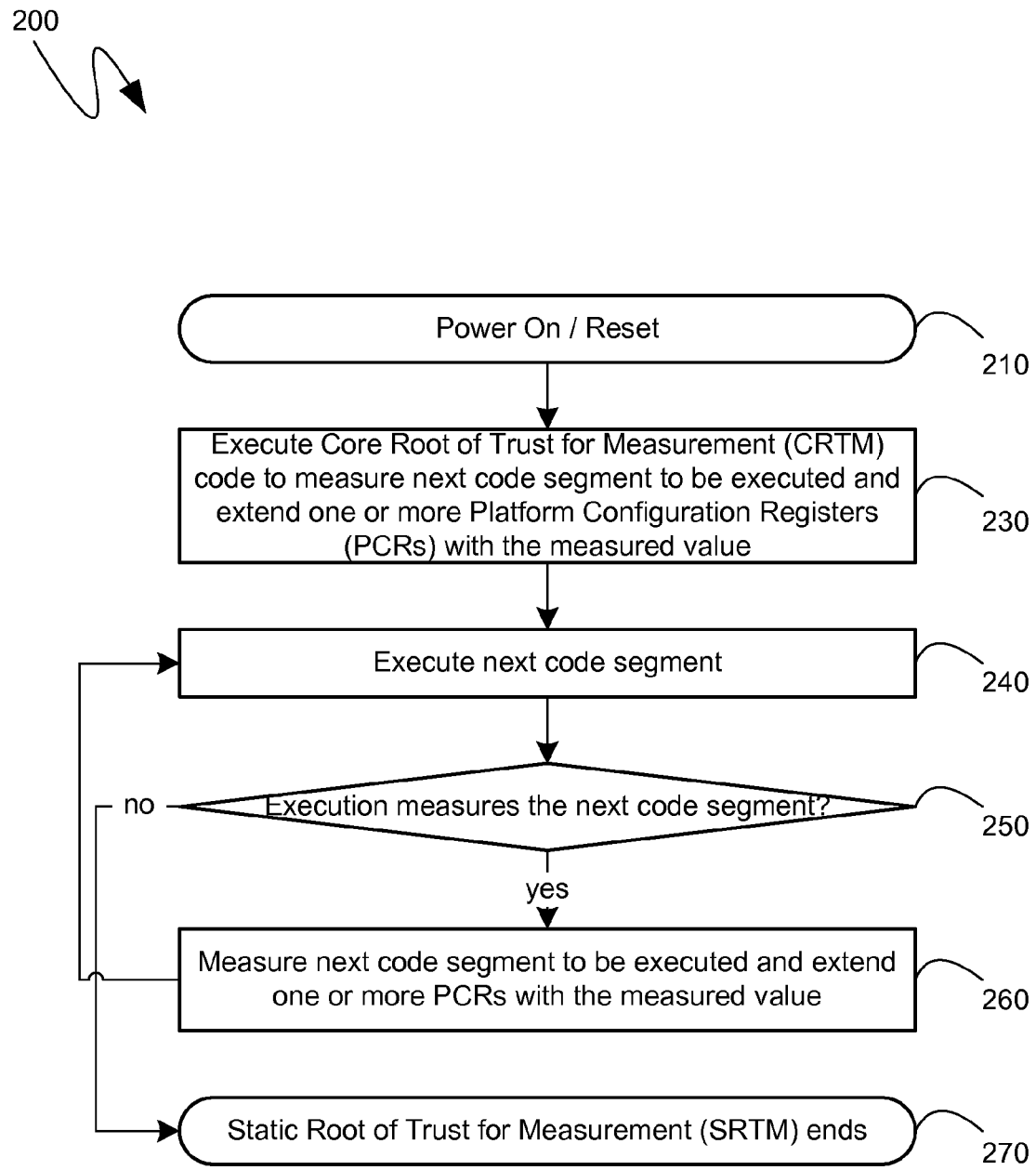
FIG. 2 is a flow diagram of an exemplary secure booting process that establishes a static trusted computing base.

The interaction of the various components illustrated in FIG. 1 is described with reference to FIGS. 2 through 5, which illustrate various processes that can be performed while booting the computing device 100 of FIG. 1. Turning to FIG. 2, a flow diagram 200 is shown illustrating a portion of an exemplary booting process undertaken by the computing device 100 to enable it to properly host the operating system 134 and program modules 135. The portion of the exemplary booting process illustrated in FIG. 2 is known as the "Static Root of Trust for Measurement" (SRTM) since there is no ability to exclude specific components from the TCB. For example, the SRTM process measures all of the activity of the computing device from the moment that the computing device is powered on or reset.

The booting of the computing device 100 can commence at step 210 when power, electrical or otherwise, is applied to the components of the computing device 100, or when the computing device 100 is reset or otherwise restarted. Initially, at step 230, a set of code known as the "Core Root of Trust for Measurement" (CRTM) can be executed from the BIOS 133. The CRTM can "measure" the next code segment that will be executed by the CPU 120. Specifically, as will be known by those skilled in the art, the execution of the CRTM by the CPU 120 can cause the CPU 120 to identify the next code segment to be executed from the BIOS 133 and pass that code segment to the TPM 150, which can calculate a hash value based on the linear set of bytes of that code segment. In one embodiment, such a hash value is obtained using the well-known SHA1 algorithm. Once the hash value is obtained, one or more PCRs in the TPM 150 can be "extended" with the hash value. As will be known by those skilled in the art, the process of "extending" a value in a PCR, for purposes of establishing a TCB, comprises concatenating the value currently stored in the PCR with the hash value of the next set of code to be executed, subsequently hashing the concatenated value, and then storing the hash of the concatenated value back in the PCR.

At step 230 of flow diagram 200, the CRTM can cause the TPM 150 to measure the next code segment to be executed, and extend one or more PCRs in the TPM with the measured value. Traditionally, PCRs 1-16 151 are used to store values obtained as part of the SRTM process, though such PCRs are merely exemplary and any other registers, including registers outside of the TPM 150 can be used. Once the code segment is measured, it can then be executed by the CPU 120 at step 240. The measured code segment can itself comprise code that measures the code segment to be executed after it. If the measured code segment does measure the code segment to be executed after it, then, at step 260, that subsequent code segment can be measured by hashing the linear set of bytes of that code segment, and then extending the registers used, such as one or more of the PCRs 1-16 151 in the TPM 150, with the hashed value in the manner described above. The booting process can then loop back to step 240 where the newly measured code segment is executed by the CPU 120, and can then proceed to continue looping wherein each code segment to be executed is first measured by the preceding code segment and the measured value is used to extend the appropriate registers, such as one or more of the PCRs 1-16 151 in the TPM 150. In such a manner, those registers can comprise values that are uniquely associated with the state of the computing device 100 from an initial power on or reset until the SRTM process ends at step 270. If any of the booting code changed, possibly in an insecure manner, the resulting values of the registers used would likewise change, indicating a deviation from the TCB.

At some point within the booting process, some code segment will not comprise a mechanism for measuring the subsequent code segment to be executed. The booting of the computing device 100 will, at that point, no longer perform the loop described above and will, instead proceed with operations and configurations that are outside of the purview of the SRTM mechanism. To illustrate such an exit from the loop comprising steps 240 and 260, a decision 250 is illustrated in FIG. 2, representing the possibilities that a code segment either does, or does not, measure the subsequent code to be executed. However, as will be recognized by those skilled in the art, the decision 250 is not meant to represent a decision performed by a particular code segment, but rather to serve to illustrate subsequent operations along both branches of a binary choice.

The values of the PCRs of the TPM 150, uniquely representing the state of the computing device as determined by actions performed during the SRTM process, can be used to provide features or services that should not be provided to computing devices that are not in a trusted state. In particular, a check of the values of the PCRs can enable processes on the computing device 100 to verify that the computing device is in a trusted state, and thereby enable those processes to condition the provision of features or services based on the existence of the computing device in a trusted state. In one embodiment, the TPM 150 can comprise one or more secrets, such as a secret code or value, that can be provided only if the values of one or more PCRs are equal to a value indicating that the computing device is in a trusted state. In such a case, processes can condition the provision of features or services upon their receipt of such a secret, since the provision of the secret necessarily indicates that the values of the PCRs are equal to expected values, thereby verifying that the computing device is in a trusted state.

In one embodiment, the particular PCR extended by the measured value of a code segment can be selected based on the functionality of code segment that was measured. Thus, for example, code segments initializing peripheral hardware devices can be measured into one PCR, while code segments loading more critical components can be measured into another PCR. The TPM 150 can then provide the secret value to enable continued booting of the computing device 100 if the values in all of the PCRs match expected values, or only if the values in some of the PCRs, such as those associated with critical elements of the computing device 100, match expected values.

Figure 4:
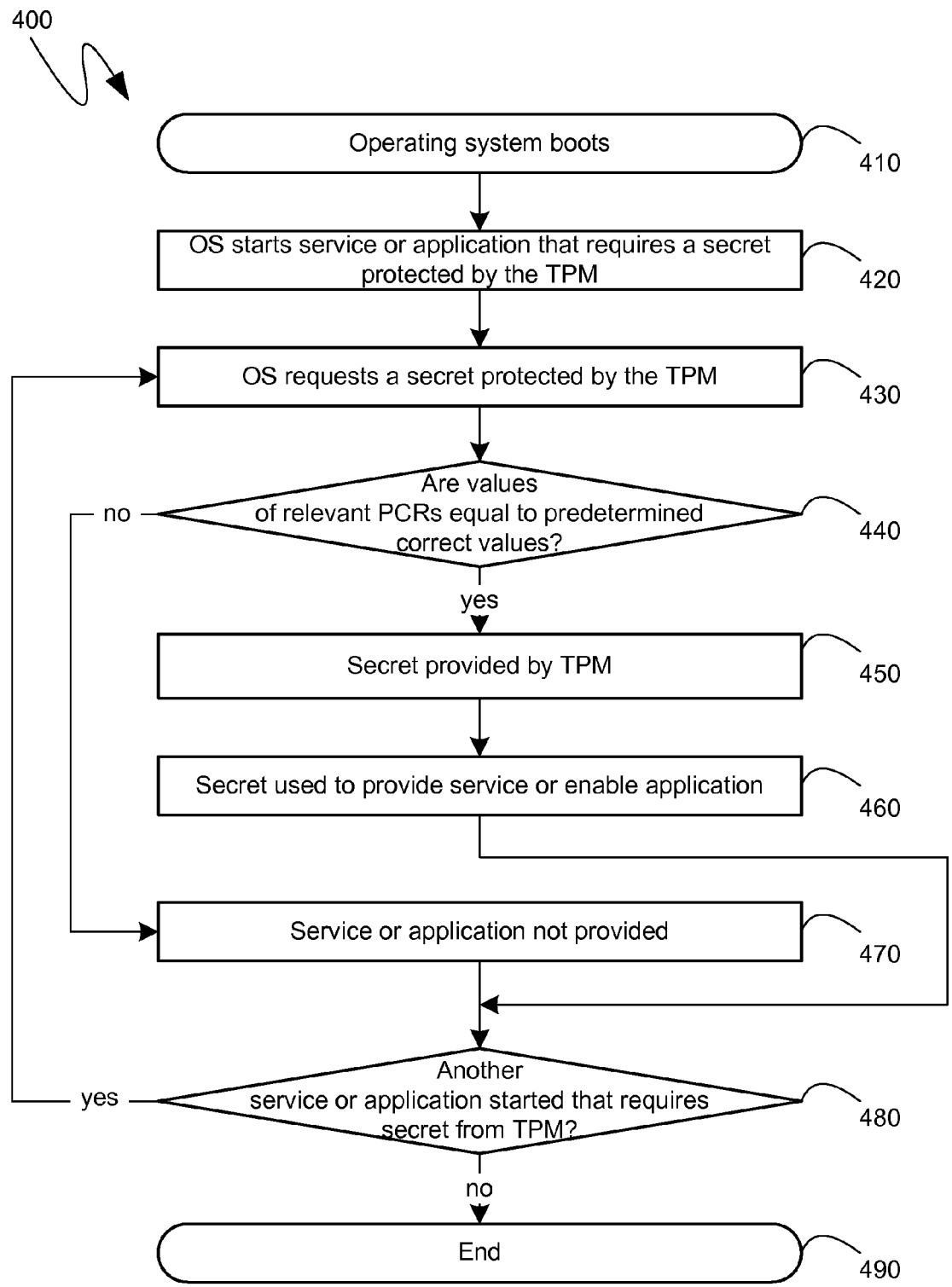
FIG. 4 is a flow diagram of an exemplary reliance on a trusted computing base.

Turning to FIG. 4, an exemplary process, represented by flow diagram 400, illustrates the conditioning of operating system services on the existence of the computing device in a trusted state. However, while the descriptions below reference the provision of services by the operating system 134, any process can condition the provision of features or services on the values of the PCRs. Similarly, while the descriptions below reference the provision of services by the operating system 134 executing after completion of the SRTM at step 270 of FIG. 2, the values of the PCRs can be checked at any point in time, including during the SRTM mechanism, and the provision of features or services can be conditioned on such intermediate values.

In the operating-system-centric example of FIG. 4, the operating system 134 can boot at step 410. Subsequently, either during the operating system's booting process, or any time after the operating system 134 has already finished booting and is actively running and hosting applications, an event can cause the operating system to start an application or service that requires a secret protected by the TPM 150. Such an event can be a user initiated event, such as the execution of an application, or the requesting of a service, or it can be an automatically triggered event, such as the loading of a subsystem during the operating system's booting process. By requiring a secret that is protected by the TPM 150, the service or application can ensure that its features are accessed only if the computing device was in a trusted state.

After the operating system 134 starts an application or service that requires a TPM-protected secret, at step 420, the operating system, or the application or service itself, can request the secret protected by the TPM 150 at step 430. Upon receiving such a request, the TPM 150 can, at step 440, compare the values of one or more of the PCRs, such as PCRs 1-16 151, to determine if the values contained therein match expected values. If the values stored in the relevant PCRs are determined to match correct values, then the computing device was in a known, trusted state. Consequently, the TPM 150 can provide the requested secret at step 450 and the secret can be used by the application or service at step 460 to provide some feature or functionality. For example, the program data 136 could be encrypted to prevent unauthorized access and the decryption key could be stored by the TPM 150. To access the program data 136, a request for the key could be made to the TPM 150 as illustrated by step 430. If the computing device was in a known, trusted state, as determined by the TPM by comparing PCR values known to represent the computing device in a trusted state to the values actually stored in the PCRs, then the TPM could provide the decryption key, thereby enabling access to the program data. If the computing device had been modified, such as to attempt to gain unauthorized access to the program data 136, the values of the PCRs would differ from values known to represent the computing device in a trusted state, and the TPM 150 would not, therefore, provide the decryption key, thereby preventing access to the program data.

Consequently, if the TPM 150 determines, at step 440, that the relevant PCRs do not contain values equal to values representing the computing device in a known, trusted state, then the TPM 150 will not provide the requested secret. Without the secret, the service or application requesting the secret will not be able to perform its intended function, as illustrated by step 470. In some cases, such as services initiated by the operating system 134 during its booting process, the failure to receive a secret from the TPM 150 can result in the failure of the operating system's booting. More commonly, however, the failure to receive a secret from the TPM 150 results in decreased functionality available to the user. For example, the failure to receive a secret from the TPM 150 can result in the inability to receive or decrypt some premium content, the accessing of which can have been conditioned on the existence of the computing device 100 in a trusted state.

If another service or application requires a secret protected by the TPM 150, then steps 430 through 470 can be repeated, as appropriate. Alternatively, processing can end at step 490. As with the decision at step 250 of FIG. 2, decision 480 is not intended to represent an explicit decision performed by the computing device 100, but rather is meant to illustrate subsequent operations along both branches of a binary choice.

As indicated previously, because the SRTM mechanisms begin measuring aspects of the startup process of the computing device 100 when the computing device is turned on or reset, there are a number of elements included in the resulting measured computing base as to which subsequent processes, such as the operating system 134, may be agnostic. In particular, many actions that are performed by the computing device 100 that are measured by the SRTM mechanisms include actions that enable the operating system 134 to begin execution. For example, the actions measured by the SRTM can include various diagnostic routines, such as memory diagnostics and disk diagnostics. However, once the operating system 134 is ready to begin execution, the exact mechanisms used to reach that point may not be relevant to subsequent processes. To the contrary, mechanisms such as memory and disk diagnostics can needlessly complicate the measured state of the computing device 100, rendering such a measured state more difficult to meaningfully analyze.

To simplify the evaluation of the measured state of the computing device 100 by subsequent processes, the CPU 120 can be designed to implement a special instruction that results in a "Dynamic Root of Trust for Measurement" (DRTM) which can save an early, and known good, state of the computing device and subsequently restore it after routines, such as diagnostic routines, have already been performed. The elements of the computing device 100 arising after the saving of the state of the computing device 100 can be irrelevant as far as subsequent processes are concerned and, consequently, the DRTM mechanisms can ignore those elements by restoring the saved state of the computing device after such elements have already been performed or initialized and then measuring the operations of the computing device occurring after the restoration of the saved state.

Figure 3A:
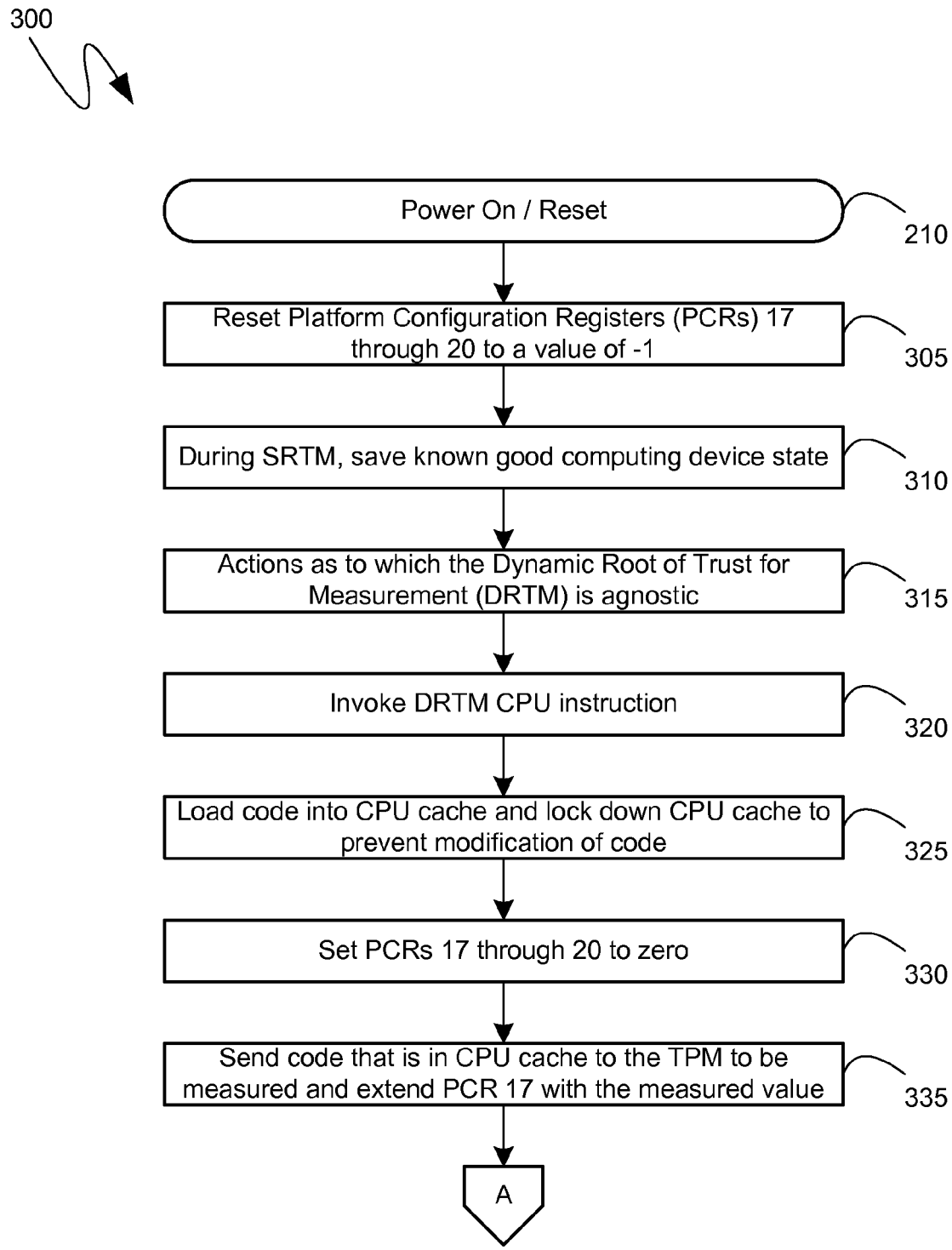
FIGS. 3a and 3b are a flow diagram of an exemplary secure booting process that establishes a dynamic trusted computing base.
Figure 3B:
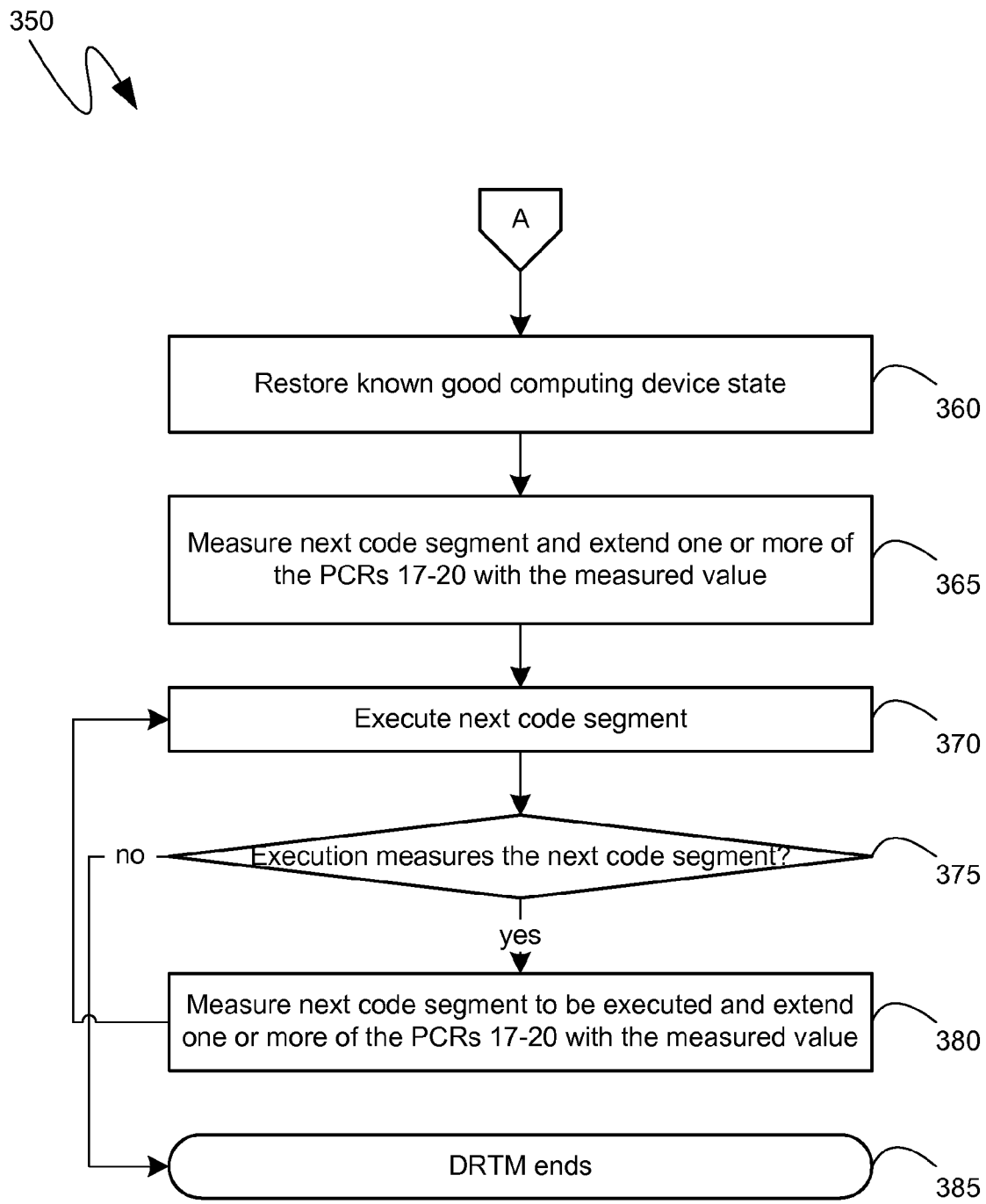

Turning to FIGS. 3*a* and 3*b*, a sequence of steps, comprising flow diagrams 300 and 350, are shown illustrating a portion of an exemplary booting process, such as of the computing device 100, utilizing DRTM mechanisms. Initially, as in flow diagram 200, the computing device can be powered on, or reset, at step 210. Subsequently, at step 305, particular PCRs in the TPM 150, namely PCRs 17-20 152 can be reset to a value of −1 (negative one). The boot process can then proceed, including the performance of SRTM mechanisms as described in detail above with reference to FIG. 2.

At some point during the SRTM mechanisms, the state of the computing device 100 can be saved, as illustrated by step 310. In one embodiment, the saved state of the computing device 100 can comprise the state of some hardware registers of the computing device and selected data tables that had been placed into RAM 132. For example, the saved state of the computing device 100 can comprise a snapshot of the Advanced Configuration and Power management Interface (ACPI) configuration. Because the DRTM mechanisms will restore this saved state and then measure operations subsequent to the restoring of the saved state, the actions performed by the computing device 100 after the saving of the known good state at step 310, but prior to its restoration at step 360, can be excluded from the measurements compiled by the DRTM mechanisms. Consequently, step 315 is meant to represent those subsequent actions as to which the DRTM is agnostic. Included among such actions can be the ending of the SRTM, though the invocation of the DRTM CPU instruction at step 320 is independent of the ending of the SRTM at step 270 and need not occur after it.

Once the computing device 100 has completed those actions, signified by step 315, as to which subsequent processes can be agnostic, the CPU 120 can receive a special CPU-manufacturer-implemented instruction signifying the initiation of a DRTM mechanism. Step 320 illustrates the receipt of such an instruction, which can cause the CPU 120 to execute a series of steps illustrated by steps 325 through 360. Initially, at step 325, the special instruction can cause the CPU 120 to load code that was provided by the CPU manufacturer into the CPU's cache and then lock down the CPU cache to prevent modification of that code by, for example, a Direct Memory Access (DMA) event. Subsequently, at step 330, the values of PCRs 17-20 152 can be changed to zero. Because the values of PCRs 17-20 152 were originally initialized to a value of −1 at step 305, the changing of those values to zero at step 330 provides a mechanism by which the proper commencement of the DRTM can be verified. In particular, in a manner analogous to that described above, the values stored in PCRs 17-20 152 can be continually extended with each successive measurement of the code to be executed or other action to be performed by the computing device 100. Because each such extension incorporates the prior value, the final value will be different depending on whether the initial value was zero or −1. Consequently, even if malicious code were able to replicate the measurements of the actions of the computing device 100 and the extending of PCRs 17-20 152 accordingly, so long as the setting of PCRs 17-20 152 from their initial value of −1 to zero is tightly controlled, the security of the boot process can be maintained because even the same actions, when measured and used to extend PCRs 17-20 152, will cause the final values stored in those PCRs to be different than expected if the initial value in those PCRs was −1. Traditionally, the setting of PCRs 17-20 152 to a value of zero is tightly controlled by limiting the capability to perform such an action to CPU-manufacturer-implemented code executed from the CPU's cache.

Once the values of PCRs 17-20 152 are set to zero, as in step 330, the code that was loaded into the CPU cache can be measured at step 335, such as by taking a hash of the linear sequence of bytes that represents that code. The resulting value can be used to extend PCR seventeen in accordance with the manner of extending PCR values described above. In one embodiment, the code loaded into the CPU cache can be measured at step 335 by sending the code to the TPM 150, whereby the TPM can hash the code and extend the value of PCR seventeen accordingly. Once the PCR seventeen has been extended with the measured value, the code in the CPU cache can, at step 360, shown in FIG. 3b as part of flow diagram 350, initiate the restoration of the state of the computing device 100 that was saved at step 310. For example, the execution of the code in the CPU cache can trigger the clearing of appropriate hardware registers of the computing device and the placing, into those registers, of the information originally saved from those registers as part of step 310. Similarly, selected data tables that had been saved from RAM 132 at step 310 can also be replaced.

After the known good state of the computing device 100, that was saved at step 310, has been restored at step 360, the subsequent actions of the computing device 100 can be measured and one or more of the PCRs 17-20 152 can be extended with the measured values. Thus, at step 365, the code in the CPU cache can measure the next code segment to be executed and extend the value of one or more of the PCRs 17-20 152 with the measured value. Thereafter, that next code segment can be loaded and executed at step 370. If that code segment itself measures a subsequent code segment, then such measuring, and associated extension of one or more of the PCRs 17-20 152, can occur at step 380. Again, as with step 250, the decision at step 375 can merely represent the possibilities that a code segment either does, or does not, measure the subsequent code to be executed and is not meant to represent a decision performed by a particular code segment.

The measuring of subsequent code, the extending of one or more of the PCRs 17-20 152, and the execution of such code, which can, in turn, measure the next code, can continue in the cycle described above, and illustrated by steps 370 through 380, until some code segment no longer measures the subsequent code segment. Generally, the such a "final" segment that is measured in the DRTM is the first segment of some code provided by the operating system 134 that can act to validate the rest of the operating system after verifying the execution of the code encompassed by the DRTM. Ultimately, the DRTM mechanism can end at step 385.

Because the DRTM mechanisms were commenced at an arbitrary time, after receipt of the dynamic root of trust CPU instruction at step 320, and because the DRTM mechanisms initially restored a known, trusted state of the computing device 100, the values of the PCRs used by the DRTM, namely PCRs 17-20 152, can be based on a more limited set of components and actions of the computing device 100. Consequently, the TCB can be easier to evaluate, and subsequent processes can condition the provision of services or functions on the values of PCRs 17-20 152. For example, the operating system 134 can condition the provision of specific services or functions on the values of PCRs 17-20 152 in the manner described in detail above with reference to the flow diagram 400 of FIG. 4.

Rather than relying on a CPU-manufacturer-specific DRTM implementation, in one embodiment, a CPU-manufacturer-independent mechanism can provide DRTM mechanisms by leveraging System Management Mode (SMM). As will be known by those skilled in the art, SMM enables a manufacturer of computing devices, such as computing device 100, to provide for the performance of maintenance or repair operations on the computing device or provide value-added functions to the computing device. For example, a manufacturer of computing devices could use SMM to provide access to a hardware resource that otherwise would report an insignificant error. In such a case, the code necessary to fully enable the hardware resource could be stored in the ROM 131 of computing device 100, and could be accessed when an interrupt, known as a System Management Interrupt (SMI) was invoked. The invocation of the SMI, as will be known by those skilled in the art, can cause the SMM code 137 to be loaded into memory, and the memory can subsequently be locked, thereby protecting the SMM code 137 from being modified, such as by a DMA event.

Because SMM code 137 is traditionally granted a high privilege level, and superior privileges to the operating system 134, it can, in one embodiment, be used to perform a variant of the DRTM mechanisms described in detail above without relying on CPU-manufacturer-specific instructions or implementations. In addition, the mere usage of SMM code to perform DRTM mechanisms should not cause such mechanisms to be any less secure than those described above since SMM code operates in a highly privileged mode and, consequently, the mechanisms described above are equally dependent on the proper operation of SMM code.

Figure 5A:
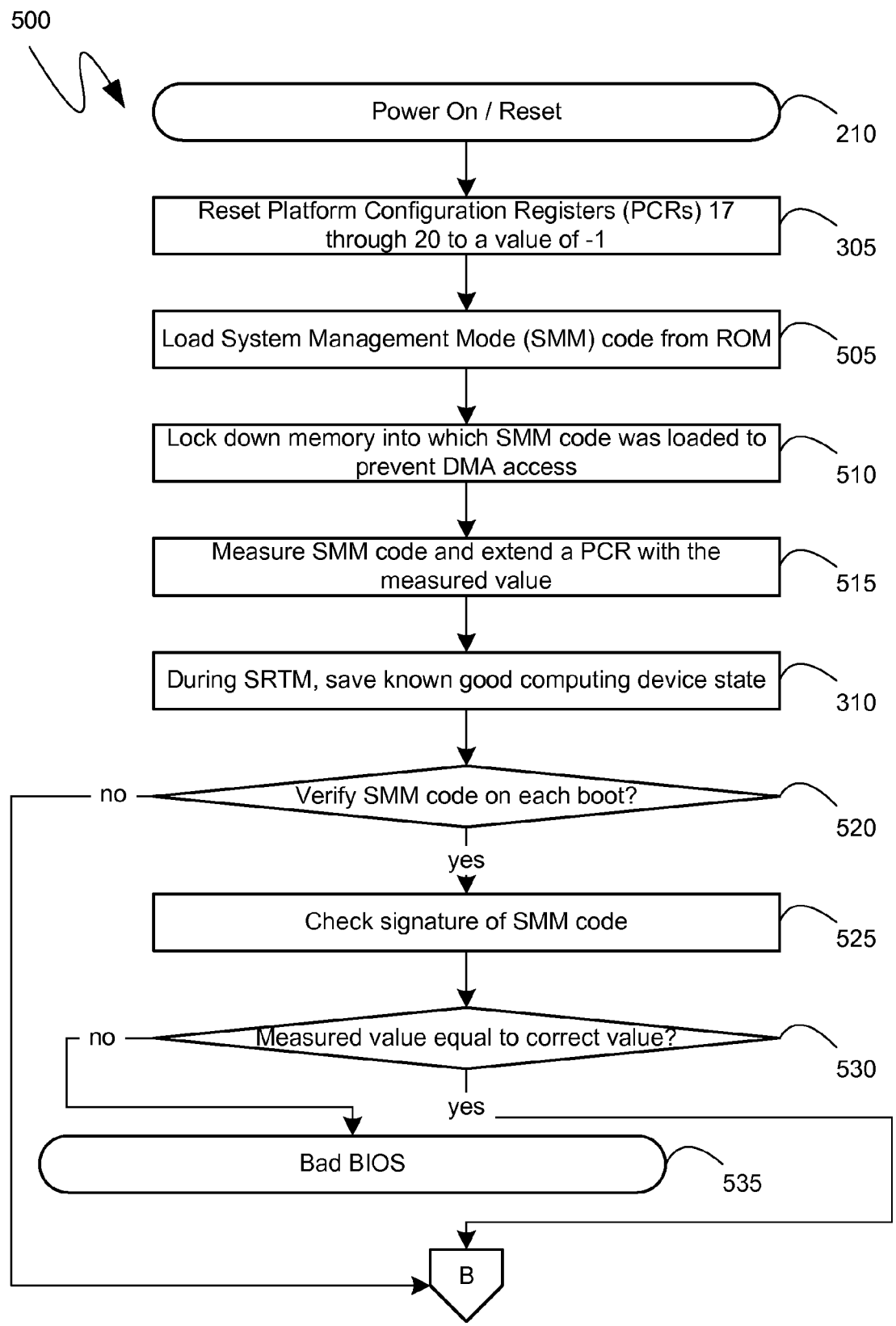
FIGS. 5a and 5b are a flow diagram of an exemplary secure booting process that establishes a dynamic trusted computing base without requiring CPU-manufacturer-implemented specific CPU instructions for establishing the dynamic trusted computing base.
Figure 5B:
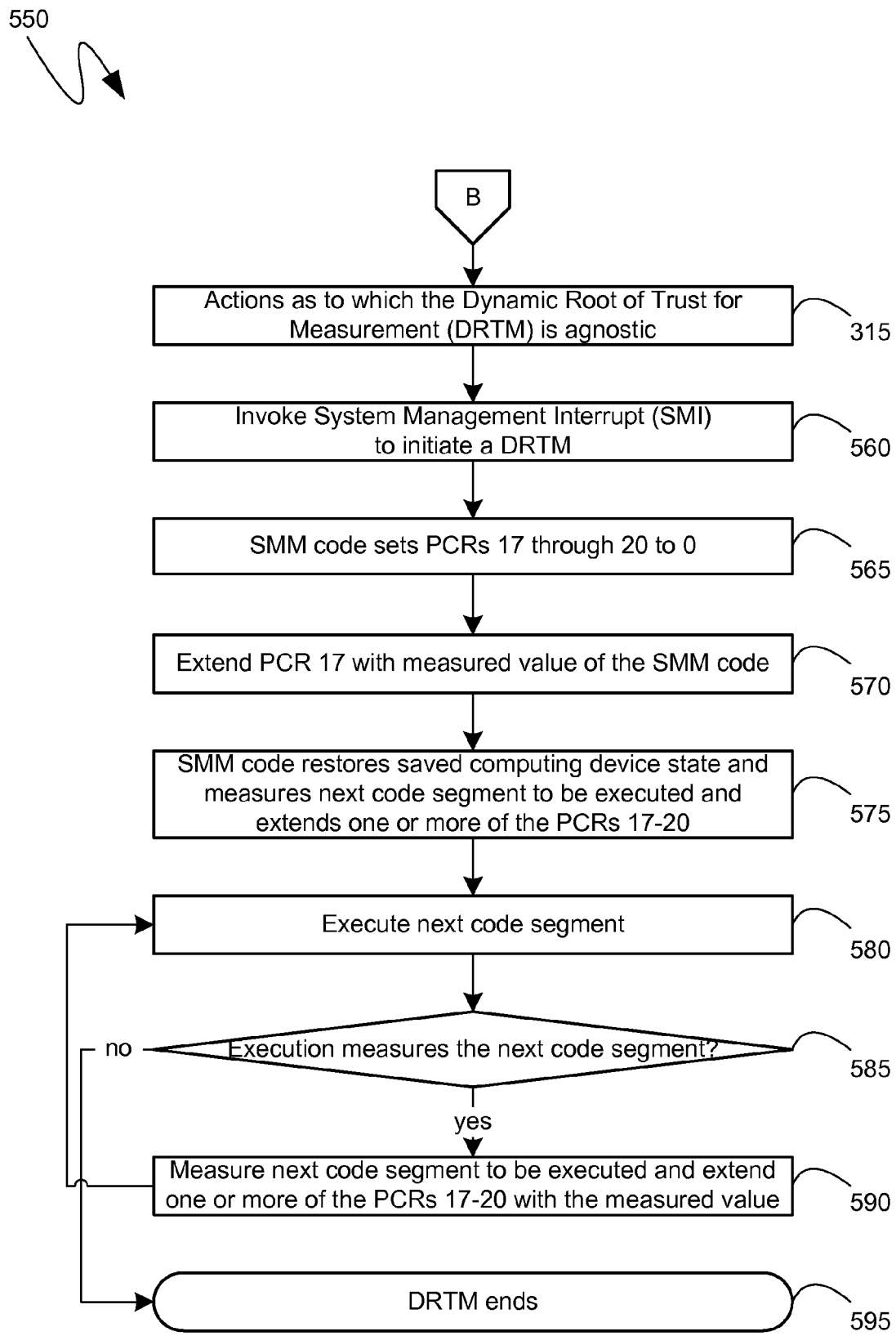

Turning to FIGS. 5a and 5b, a sequence of steps, comprising flow diagrams 500 and 550, are shown illustrating a portion of an exemplary booting process, such as of the computing device 100, utilizing DRTM mechanisms initiated by SMM code 137 instead of a CPU-manufacturer-specific DRTM instruction. Initially, as above, the computing device 100 can be powered on or reset at step 210. Subsequently, as described above, CRTM code can initiate SRTM mechanisms that can measure the code executed and the actions performed by the computing device 100 during at least a preliminary portion of the booting process. As part of the SRTM-measured actions, the PCRs 17-20 152 can be reset to a value of −1 at step 305 in the manner described above. In addition, as also described above, a known, good state of the computing device 100 can be saved at step 310. In one embodiment, the state saved at step 310 can be saved into SMM memory.

SRTM-measured actions can also include the loading of the SMM code 137 used to initiate DRTM mechanisms without relying on a CPU-manufacturer-implemented instruction. In particular, at step 505, the SMM code 137 can be loaded, or expanded, from ROM 131 into SMM memory for subsequent execution. Once the SMM code 137 has been loaded into SMM memory, the SMM memory can, at step 510, be locked to prevent subsequent modification of the SMM code, such as by a DMA request. Subsequently, at step 515, the SMM code 137 can be sent to the TPM 150 to be measured, such as by computing a hash value of the linear set of bytes representing the SMM code. Either the SMM code 137 as stored in ROM 131, or the expanded SMM code 137 in SMM memory, can be measured, and a PCR of the TPM 150, such as PCR 0, can be extended with the measured value of the SMM code.

The measured value of the SMM code 137 can be used to verify the integrity of the SMM code 137. In one embodiment, the SMM code 137 need not be verified during the booting process of the computing device 100 because of security inherent in the updating process used to modify the SMM code. In an alternative embodiment, the SMM code 137 can be verified each time the computing device 100 boots. Step 520, rather than representing a decision performed by a particular code segment, is, instead, intended to merely represent these two possible embodiments.

In the former embodiment, the SMM code 137 can be initially stored in the ROM 131 by the manufacturer of the computing device 100, or a similar trusted authority. Subsequently, any updates or modifications to the SMM code 137 can be performed by a trusted updating process that first verifies the new SMM code prior to the update. Such a trusted updating process can be part of the SMM code 137 itself, in which case each subsequent update can be verified by the update preceding it, thereby extending a chain of trust back to the manufacturer of the computing device 100. Consequently, the SMM code 137 is either the set of instructions initially stored in the ROM 131 by a trusted authority, or it is a set of instructions that was verified prior to being stored into ROM in the first place. Thus, in one embodiment, no further verification of the SMM code 137 need be performed before it is executed.

However, in an alternative embodiment, the SMM code 137 can additionally be verified each time the computing device 100 is booted to, for example, detect hardware errors. At step 525, a value obtained by measuring verified SMM code can be obtained from ROM 131. To protect such a value, it can be digitally signed using the private key of a trusted party, such as the manufacturer of the computing device 100, and can, thereby, be decrypted using the corresponding public key. The known correct value can then be compared, at step 530, to the value of the SMM code 137 that was obtained at step 515 and stored in a PCR of the TPM 150. If the values do not match, then the BIOS 133 may have been corrupted or damaged and the computing device 100 may not boot or the BIOS 133 may have some predetermined remediation routine that may be executed to, for example, display an error. If, conversely, the measured value of the SMM code 137 is determined, at step 520, to be equal to the predetermined, and decrypted, correct value, then an SMI can be invoked at step 560 to enable the SMM code 137 to be executed in System Management Mode. In one embodiment, steps 525 and 530 can be performed by immutable code that originates from a trusted authority, such as the manufacturer of the computing device 100, and cannot subsequently be changed. In an alternative embodiment, steps 525 and 530 can be performed by code whose security can be verified, such as the SMM code 137, whose security can be verified via the secure updating process described above.

In one embodiment, before invoking an SMI at step 560, as illustrated in flow diagram 550 of FIG. 5b, additional actions as to which the DRTM can be agnostic can be performed at step 315. As described above, such additional actions of step 315 can include various diagnostic routines and other routines that can prepare the computing device 100 for the execution of the operating system 134. Once the computing device 100 is ready for the operating system 134 to boot, or at another appropriate time, an SMI can be invoked at step 560, specifying that the SMM code is to be executed to initiate a DRTM and, thereby, provide for the execution of the SMM code 137 and the initiation of DRTM mechanisms. Following the invocation of the SMI at step 560, the SMM code 137 can be executed from SMM memory to, at step 565, set PCRs 17-20 152 to zero, much as would have been performed in step 330, described above, in response to the CPU-manufacturer-specific instruction initiating a DRTM. In one embodiment, the CPU 120, the TPM 150 or other chipsets of the computing device 100 may be modified to enable SMM code 137 to set PCRs 17-20 152 to zero. For security purposes, the computing device 100 can be configured to limit the ability to modify PCRs 17-20 152 to exclusively the SMM code 137. In one embodiment, such a configuration of the computing device 100 can be accomplished by limiting the ability to set PCRs 17-20 152 to zero only when the CPU 120 is executing in SMM.

Once set to a value of zero, PCRs 17-20 152 can be extended with measured values of code segments that are to be executed after the initiation of the DRTM mechanisms. Initially, the measured value of the SMM code 137, that was obtained at step 515, can be extended into PCR seventeen at step 570. Subsequently, the SMM code 137 can be executed at step 575. Among the actions performed by the SMM code 137 at step 575 can be the restoration of the state of the computing device 100 that was saved at step 310. As indicated previously, such a restoration of the saved state of the computing device 100 can comprise the restoration of data into specific hardware registers and the restoration of specific data tables into RAM 132. In addition, the SMM code 137 can, at step 575, measure, or cause to be measured, the next code segment to be executed, and can extend, or cause to be extended, one or more of the PCRs 17-20 152 with the measured value.

The measured code segment can be executed at step 580 and, as part of its execution, the measured code segment can, at step 590, measure the next code segment to be executed and further extend one or more of the PCRs 17-20 152 with the measured value of that code. That subsequent code segment can then be executed, and steps 580 through 590 can be repeated until, as indicated by decision 585, the execution of a code segment no longer measures the next code segment. As before, the presence of decision 585 in flow diagram 500 is not meant to illustrate an explicit code-based, or hardware-based, decision that is made, but rather is intended only to act as a visual representation of the binary possibilities that the subsequent code segment either does, or does not measure the next code segment.

Ultimately, a measured code segment will no longer measure a subsequent code segment and the DRTM mechanisms can end at step 595. Typically, such a last code segment will be part of the operating system 134. In one embodiment, that operating system code segment can check the values stored in the PCRs 17-20 152 to verify that the actions measured by the SMM-initiated DRTM were as expected. Subsequently, SMM code can cease executing at step 595, though, in another embodiment, the operating system 134 can itself continue to measure elements of the computing device 100 and extend appropriate registers, such as the PCRs in the TPM 150. Ultimately, the values stored in the PCRs 17-20 152 can be utilized, such as in the exemplary manner described above with reference to FIG. 4, to condition the provision of functions or services on the existence of the computing device 100 in a trusted state, as indicated by the measurements obtained during the DRTM mechanisms and reflected in the values of PCRs 17-20.

The process by which a computing device, such as computing device 100, is placed into a trusted state can be normalized such that the mechanism used is abstracted from the calling mechanism. For example, both DRTM mechanisms described can provide similar functionality as far as subsequent processes are concerned. Thus, in one embodiment, an entry point for initiating a DRTM can be specified in an Advanced Configuration and Power Interface (ACPI) table and the calling process using such an entry point can be agnostic as to whether the DRTM is initiated by a CPU-manufacturer-specific instruction or by the SMM code 137. Consequently, a manufacturer of a computing device, such as computing device 100, can choose between implementing the DRTM, in response to the call specified in, for example, the ACPI table, by either relying on CPU-manufacturer-specific implementations, or CPU-manufacturer-agnostic implementations that utilizes SMM code in the manner described above.

As can be seen from the above descriptions, DRTM mechanisms can be initiated by SMM code in a secure manner to provide measurements reflecting the state of the computing device and upon which functions or services can be conditioned. In view of the many possible variations of the subject matter described herein, we claim as our invention all such embodiments as may come within the scope of the following claims and equivalents thereto.

We claim:

1. A method of implementing a dynamic root of trust for measurement comprising the steps of:
   invoking a system management interrupt to execute system management mode code while a computing device is in system management mode;
   executing the system management mode code to set a dynamic root of trust for measurement register in a trusted platform module to a secondary value indicating proper commencement of the dynamic root of trust for measurement;
   executing the system management mode code to restore a state of the computing device to a known state; and
   extending the dynamic root of trust for measurement register with at least one value representing a state established by the system management mode code.

2. The method of claim 1, wherein the dynamic root of trust for measurement register is extended with a second value obtained by measuring at least one code segment, the measuring comprising hashing a linear set of bytes representing the at least one code segment.

3. The method of claim 1, wherein the extending the dynamic root of trust for measurement register with the at least one value comprises concatenating the at least one value onto an existing dynamic root of trust for measurement register value, and then hashing the concatenation.

4. The method of claim 1 further comprising the steps of verifying the system management mode code.

5. The method of claim 1 further comprising the steps of saving the known state as part of a static root of trust for measurement.

6. The method of claim 1 further comprising the steps of measuring at least one code segment executed after the invocation of the system management interrupt.

7. The method of claim 1 further comprising the steps of obtaining a secret value from the trusted platform module if a value of the dynamic root of trust for measurement register is equal to a predetermined correct value for the dynamic root of trust for measurement register.

8. The method of claim 7, wherein the secret value is required to provide access to one or more capabilities of the computing device.

9. A computing device comprising:
   a trusted platform module comprising a dynamic root of trust for measurement register;
   read-only memory comprising system management mode code for performing steps comprising restoring a state of the computing device to a known state and setting the dynamic root of trust for measurement register to a secondary value indicating proper commencement of a dynamic root of trust for measurement; and
   computer-executable instructions for performing steps comprising verifying the system management mode code and invoking a system management interrupt to execute the system management mode code while the computing device is in system management mode.

10. The computing device of claim 9, wherein the system management mode code extends the dynamic root of trust for measurement register with at least one value representing a state established by the system management mode code.

11. The computing device of claim 10, wherein the dynamic root of trust for measurement register is extended with a second value obtained by measuring a code segment, the measuring comprising hashing a linear set of bytes representing the code segment.

12. The computing device of claim 10, wherein the extending the dynamic root of trust for measurement register with the at least one value comprises concatenating the at least one value onto an existing dynamic root of trust for measurement register value, and then hashing the concatenation.

13. The computing device of claim 9 further comprising computer-executable instructions for saving the known state as part of a static root of trust for measurement.

14. The computing device of claim 9, wherein the system management mode code further performs steps comprising measuring at least one code segment executed after the invocation of the system management interrupt.

15. The computing device of claim 9, wherein the trusted platform module further comprises a secret value needed to access one or more capabilities of the computing device, the secret value being provided if a value of the dynamic root of trust for measurement register is equal to a predetermined correct value for the dynamic root of trust for measurement register.

16. The computing device of claim 15 further comprising an operating system that requests the secret value.

17. A trusted platform module for use in a computing device, the trusted platform module comprising:
   one or more registers for securely storing values, the one or more registers comprising a dynamic root of trust for measurement register initially set to a first value and subsequently set to a second value different from the first value, the second value indicating proper commencement of a dynamic root of trust for measurement, wherein the setting of the dynamic root of trust for measurement register to the second value is performed by system management mode code executing while the computing device is in system management mode; and
   a secret value needed to access one or more capabilities of the computing device, wherein the secret value is provided if one or more values of the one or more registers are equal to corresponding one or more predetermined correct values.

18. The trusted platform module of claim 17, wherein the dynamic root of trust for measurement register is extended after being set to the second value by concatenating a measured code segment value onto an existing dynamic root of trust for measurement register value, hashing the concatenation and storing the hash in the dynamic root of trust for measurement register as its new value.

19. The trusted platform module of claim 17, wherein the system management mode code restores a state of the computing device to a known state.

20. The trusted platform module of claim 17, wherein system management mode code is verified prior to execution.

* * * * *